No. 652,295. Patented June 26, 1900.
W. SHAKESPEARE, Jr. & G. W. LOW.
M. E. LOW, Administratrix of G. W. LOW, Dec'd.
PHOTOGRAPHIC SHUTTER.
(Application filed Dec. 1, 1899.)

(Model.)

Witnesses
Edward G. Howard.
Edgar R. Mead.

Inventors.
G. W. Low, Deceased
Mary E. Low, Administratrix
Wm Shakespeare Jr.
By their Attorney
Phillips Abbott

UNITED STATES PATENT OFFICE.

WILLIAM SHAKESPEARE, JR., AND MARY E. LOW, ADMINISTRATRIX OF GARRETT W. LOW, DECEASED, OF KALAMAZOO, MICHIGAN.

PHOTOGRAPHIC SHUTTER.

SPECIFICATION forming part of Letters Patent No. 652,295, dated June 26, 1900.

Application filed December 1, 1899. Serial No. 738,766. (Model.)

*To all whom it may concern:*

Be it known that we, WILLIAM SHAKESPEARE, Jr., and GARRETT W. LOW, (since deceased,) citizens of the United States, and residents of Kalamazoo, in the county of Kalamazoo and State of Michigan, have invented certain new and useful Improvements in Photographic Shutters, of which the following is a full, clear, and exact description.

The invention relates to new and improved devices for connecting the pneumatic engine of the shutter with the shutter wings or slides, whereby the principle in mechanics known as the "toggle-lever" is availed of in such manner as to secure the positive action of the wings or slides both in opening and closing in a very satisfactory manner and by the expenditure of less power by the engine than in any other way known, and the construction is such that the presence of any obstructive material—such as corrosion of the parts, dust, lint, and the like—cannot interfere with the perfect operation of the apparatus because of the control that the engine has over the wings or slides by reason of the employment of the toggle-lever principle. Furthermore, the construction of the parts is very simple, inexpensive, and durable.

Figure 1:
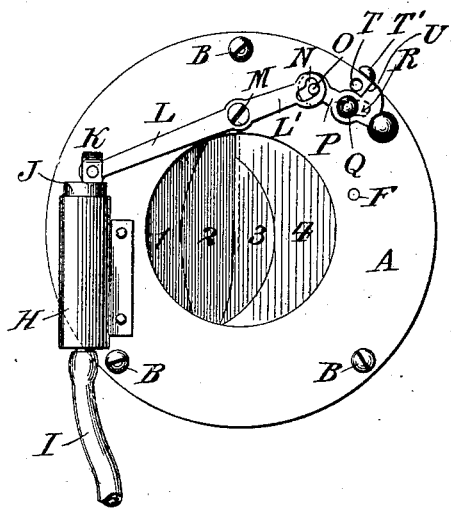
Figure 2:
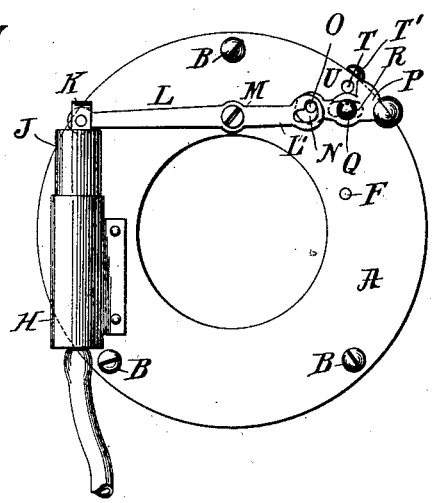
Figure 3:
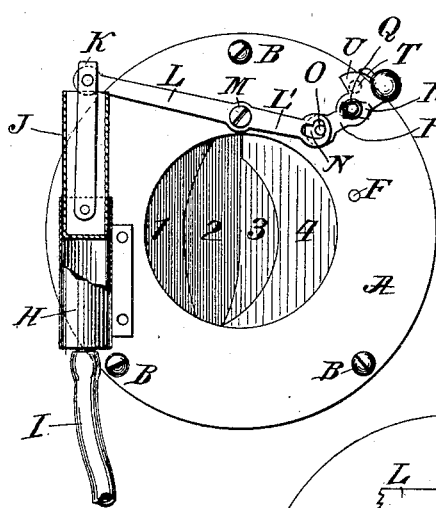
Figure 4:
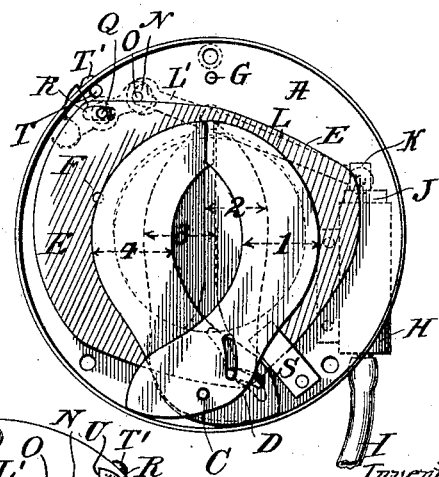
Figure 5:
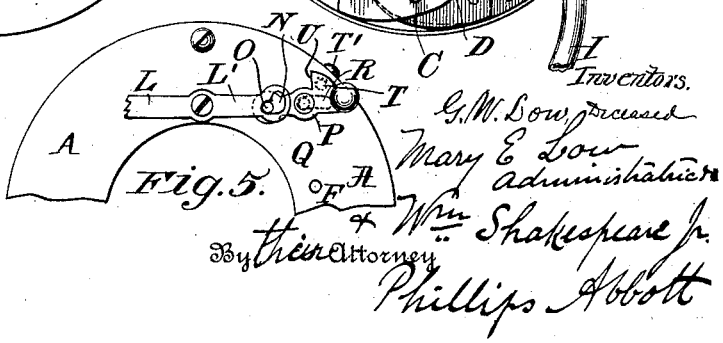

Figure 1 is a face view or elevation of a shutter embodying the invention, the parts being in the positions they occupy when the shutter is in its primary or closed position. Fig. 2 is a face view or elevation of the devices shown in Fig. 1, the parts being in the position they occupy when the shutter is open. Fig. 3 is a face view or elevation of the parts shown in Figs. 1 and 2, the engine being shown partly in section, the parts being in the position they occupy when the shutter has been opened and closed—in other words, at the end of an instantaneous exposure. Fig. 4 illustrates an elevation of the reverse or inside of the shutter-case, the back board or plate having been removed. Fig. 5 illustrates a face view of a portion of the shutter, showing the toggle-levers in the position they occupy during the return stroke of the engine after an instantaneous exposure has been made.

A illustrates the front plate of the shutter, which is preferably made of metal, but may, however, be made of any suitable material. It is attached to the back board or plate by screws B B in the usual manner or by other suitable means. On the interior of the case there are in the present instance four wings or slides, which are clearly illustrated in dotted lines in Fig. 4 and are numbered, respectively, 1, 2, 3, and 4, 1 and 4 being the outside wings and 2 and 3 the inside wings. They may be arranged in such manner as preferred, but in the present instance are shown all pivoted upon a single pivot C, (see Fig. 4,) and the pin which actuates them is shown at D. This pin is connected to a perforated plate E and works through slots shown in the wings or slides in the usual manner. The plate E is pivoted to the case at F. (See Fig. 4.) The pin G is merely a guide or a centering-pin used to aid in adjusting the back board or plate upon the shutter-case proper.

H is the pneumatic engine, which is preferably made of metal, as usual, and is provided with the usual rubber tube I, which connects with a bulb.

J is the piston of the engine. It has a link K pivoted to it, as shown, which in turn engages with one end of a lever L, which is pivoted to the case of the shutter at M. The other end L' of this lever is provided with an enlarged terminal in which there is a slot N, of substantially-rectangular form, in which works a pin O, which is connected to one end of another lever P. This lever P is connected by a pivot Q to the perforated plate E, passing through a slot R, made in the front board or case A.

S (see Fig. 4) is a guide and support for the perforated plate E, consisting of an overlapping piece of metal riveted to the front of the case, as shown. Its function is to support and hold snugly in position the free edge of the plate E.

It will be noted that in Figs. 1 and 3 the wings appear differently on different sides of the lens-opening. This is suggestive of irregularity in their shape and perhaps defect in their arrangement; but it is not so. It has been found that the wings in this shutter, as well as in certain others of similar construction, work better when they are arranged in regular series in contradistinction to being arranged in pairs. Therefore in said Figs. 1 and 2 of the drawings the wings are shown as arranged in regular series—4, 3, 2, 1—4 being the uppermost one or that nearest the observer, and the others in succession arranged behind one another. This feature is, however, not at all essential to the invention, and therefore in Fig. 4 the wings are shown arranged in pairs, as usual, whereby symmetry in their outline is observable.

The operation of the apparatus is obvious. As stated, the normal or primary position of the parts is shown in Fig. 1. Now to take a snap-shot or make a so-called "instantaneous exposure" the bulb is squeezed, whereby the piston of the engine is projected so that the pin O moves from its position, as shown in Fig. 1, into the upper part of the rectangular or bayonet-joint slot N, and as the lever L moves toward the horizontal position, as shown in Fig. 2, the straightening of the two toggle-levers L' and P necessitates movement of the lever P to the right, as shown in Fig. 2, so that instead of the pin Q (which is connected with the plate E) resting at the left-hand end of the slot R it is moved to or beyond the center of said slot, thus conveying a sliding movement to the plate E. Consequently through the actuating-pin D the wings are moved and caused to open, as shown in Fig. 2. Upon further upward movement of the piston the parts leave the position shown in Fig. 2 and acquire that shown in Fig. 3—that is to say, the end L' of the lever having passed beyond the center the toggles are flexed again, so that the pin Q is drawn inwardly, causing a reverse movement of the plate E, whereby the wings or slides are again closed. Upon relaxing the bulb the suction draws the piston back into the cylinder, so that the lever L L' makes a reverse movement; but when going in this direction no thrust is exerted upon the lever P and the pin Q, although that lever is rocked upon the pin Q, because the pin O on the end of the lever during this movement of the parts slides forwardly, as shown in Fig. 5, into the horizontal section of the rectangular or bayonet-joint slot, the motion being lost in this manner, and these parts return to their primary normal position without movement of the wings or slides. To make a time exposure, means are provided to arrest the movement of the levers when they attain the position shown in Fig. 2—that is to say, when the shutter is fully open. Any suitable means may be employed for this purpose. A serviceable one is shown in the pin T, which is adapted to be projected into the path of a hook U upon the lever P, as shown in Fig. 2. Its movement is effected by pushing the knob T' inwardly and outwardly. It is supported by the case and slides through a little slot made therein.

It will be obvious to those who are familiar with this art that modifications may be made in the details of construction of the parts illustrated and described without departing from the essentials of the invention. Therefore the invention is not limited to such details.

Having described the invention, what is claimed is—

1. The combination, in a shutter, of toggle-levers, one of which is pivoted to the shutter-case and connected with the piston of the engine, the other pivoted upon an oscillating lever which actuates the wings, for the purposes set forth.

2. In a shutter, the combination of toggle-levers, one of which is pivoted upon the shutter-case and connected with the piston of the engine, the other being pivoted upon an oscillating lever which actuates the wings, and means to arrest the movement of the levers when the wings are fully open, for the purposes set forth.

3. The combination in a shutter of toggle-levers one of which is connected with the piston of the engine and the other with the means which actuates the wings, the levers being connected to each other by a pin-and-slot connection whereby lost motion is permitted when the parts move in one direction, for the purposes set forth.

4. In a shutter the combination of toggle-levers, one of which is connected with the piston of the engine and the other with the means which actuates the wings, the levers being connected to each other by a pin and bayonet-joint slot, whereby lost motion is permitted when the parts move in one direction, for the purposes set forth.

5. In a shutter the combination of toggle-levers, one of which is pivoted to the case of the shutter and connected with the piston of the engine by a pivoted link, and the other pivoted to the means which actuates the wings, the levers being connected to each other by means which permit lost motion when the parts move in one direction, for the purposes set forth.

6. In a shutter the combination of toggle-levers, one of which is pivoted to the case of the shutter and connected to the piston of the engine in such a manner as to compensate for the swing of the lever, the other being pivoted to the means which actuates the wings, the said levers being connected to each other in such manner that lost motion is permitted when they move in one direction, for the purposes set forth.

7. In a shutter the combination of toggle-levers, one of which is pivoted to the case of the shutter and connected to the piston of the engine in such a manner as to compensate for the swing of the lever, the other being pivoted to the means which actuates the wings, the said levers being connected to each other in such manner that lost motion is permitted when they move in one direction, and means to arrest the movement of the levers when the wings are fully opened, for the purposes set forth.

Signed at Kalamazoo, in the county of Kalamazoo and State of Michigan, this 4th day of November, 1899.

WILLIAM SHAKESPEARE, JUNIOR.
MARY E. LOW,
*Administratrix of Garrett W. Low, deceased.*

Witnesses:
CORA M. SHAKESPEARE,
EDITH SHAKESPEARE.